(No Model.)
J. EPHRAIM.
SOCKET JOINT OR COUPLING FOR RODS, &c.
No. 605,541. Patented June 14, 1898.
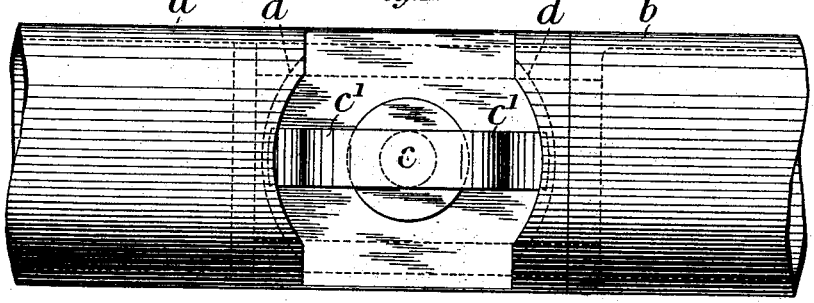
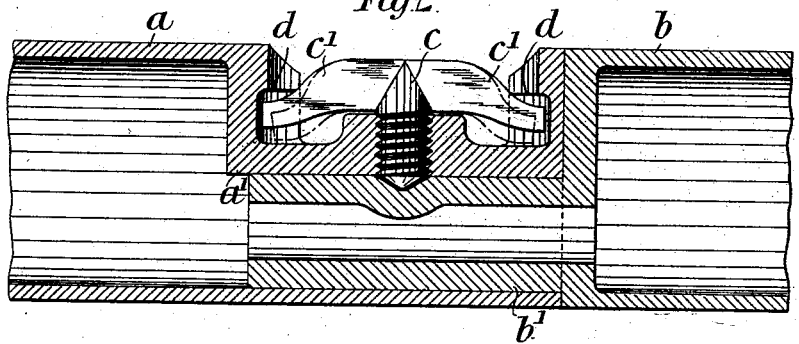

UNITED STATES PATENT OFFICE.

JOSEPH EPHRAIM, OF LONDON, ENGLAND.

SOCKET-JOINT OR COUPLING FOR RODS, &c.

SPECIFICATION forming part of Letters Patent No. 605,541, dated June 14, 1898.

Application filed December 28, 1897. Serial No. 663,877. (No model.)

*To all whom it may concern:*

Be it known that I, JOSEPH EPHRAIM, a subject of the Queen of Great Britain, residing at London, England, have invented a new and Improved Socket-Joint or Coupling for Rods and the Like, of which the following is a specification.

This invention relates to improvements in socket-joints or couplings for rods and the like of the kind described in former Letters Patent No. 432,695, dated July 22, 1890. In the said former patent a joint is described wherein the two parts to be joined were formed, respectively, with male and female sockets designed to be secured together by a set-screw.

The subject of this invention comprises novel means for preventing the set-screw from becoming detached from the joint. For this purpose I recess that part of the joint which receives the set-screw and form the recess with an undercut. I then, after the said set-screw has been inserted, expand the lateral wings thereof underneath the said undercut portions, which are of sufficient height to allow space for the said screw to rise the necessary height for releasing the joint.

To enable my invention to be fully understood, I will describe it by reference to the accompanying drawings, in which—

Figure 1 is a plan of a joint having my improvements applied thereto. Fig. 2 is a longitudinal section thereof.

$a$ and $b$ are the two parts of the joint, and $a'$ and $b'$ the socket and projection formed upon the ends thereof, respectively, the projection $b'$ fitting into the socket $a'$, as shown, and the two parts being held together by the set-screw $c$, as clearly shown in Fig. 2 and described in the said former patent.

Referring now to the construction shown in Figs. 1 and 2, the set-screw is operated by the lateral wings $c'$, which when the screw $c$ is first screwed into position in the hole are of the shape indicated by the dotted lines in Fig. 2.

$d\ d$ are the undercut ends formed in the recess made to receive the screw, so that when the lateral wings $c'\ c'$ are expanded to the shape shown in full lines the ends thereof project under the said undercut surfaces, and the set-screw is prevented from leaving the socket $a'$, but is allowed sufficient movement to release the part $b'$ from the said socket.

It will be understood that my improved joint is applicable to ramrods, chimney-sweeping machines, drain-cleansing machines, and to all rods made in lengths and which require to be quickly and securely connected together or taken apart.

Having now particularly described and ascertained the nature of my said invention and in what manner the same is to be performed, I declare that what I claim is—

In a rod-coupling, the combination of the socket-pieces, one of which is adapted to receive the other and provided with undercut edges, and a set-screw having expansible wings which engage under the said undercut edges of the socket-piece, substantially as described.

JOSEPH EPHRAIM.

Witnesses:
E. JOSEPH,
JOHN E. BOUSFIELD.